(12) United States Patent
Takahashi et al.

(10) Patent No.: US 11,609,085 B2
(45) Date of Patent: Mar. 21, 2023

(54) DISPLACEMENT MEASUREMENT SYSTEM (71) Applicant: Panasonic Intellectual Property Management Co., Ltd., Osaka (JP)

(72) Inventors: Yoshie Takahashi, Osaka (JP); Yoshiki Shimata, Osaka (JP); Kazuto Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 17/234,938

(22) Filed: Apr. 20, 2021

(65) Prior Publication Data
US 2021/0333095 A1 Oct. 28, 2021

(30) Foreign Application Priority Data
Apr. 28, 2020 (JP) .............................. JP2020-079574

(51) Int. Cl.
*G01L 1/24* (2006.01)
*G01B 11/16* (2006.01)

(52) U.S. Cl.
CPC ............. *G01B 11/16* (2013.01); *G01L 1/24* (2013.01)

(58) Field of Classification Search
CPC .......... G01B 11/16; G01B 11/02; G01L 1/24; G01L 1/241; G01L 1/247
See application file for complete search history.

(56) References Cited

U.S. PATENT DOCUMENTS

| | | | | |
|---|---|---|---|---|
| 8,810,780 B1* | 8/2014 | Barcelo | ................... | G01L 1/241 356/32 |
| 9,423,243 B1* | 8/2016 | Ikeda | ................... | G01B 11/168 |
| 10,281,345 B2* | 5/2019 | Uemura | ................. | G01B 11/18 |
| 10,317,341 B2* | 6/2019 | Harris | .................... | G01N 21/31 |
| 10,655,953 B2* | 5/2020 | Ikeda | ...................... | G01N 21/25 |
| 2005/0169348 A1* | 8/2005 | Chen | ....................... | G01K 11/20 374/161 |
| 2007/0189359 A1* | 8/2007 | Chen | ....................... | B82Y 30/00 374/161 |
| 2010/0022893 A1 | 1/2010 | Hart | | |
| 2011/0152694 A1* | 6/2011 | Shimoyama | ......... | A61B 5/6826 600/480 |
| 2014/0211195 A1* | 7/2014 | Barcelo | ................... | G01L 1/241 356/32 |
| 2018/0017489 A1 | 1/2018 | Harris et al. | | |

(Continued)

FOREIGN PATENT DOCUMENTS

EP 3051273 8/2016
JP 56581495 1/2015
(Continued)

*Primary Examiner* — Freddie Kirkland, III
(74) *Attorney, Agent, or Firm* — Wenderoth, Lind & Ponack, L.L.P.

(57) ABSTRACT

Provided is a displacement measurement system including: a sensor that is contactable with a measurement target object and includes a first spacer that has at least a one-dimensional spread, and two or more types of light emitting particles that are distributed over the spread of the first spacer and emit light at different wavelengths by an excitation energy; an excitation energy source that causes the two or more types of light emitting particles included in the sensor to emit light; and a light receiver that receives light emitted from the sensor.

11 Claims, 3 Drawing Sheets

(56) References Cited

U.S. PATENT DOCUMENTS

2018/0113036 A1   4/2018  Uemura et al.
2018/0180496 A1*  6/2018  Uemura ............... G01B 11/161
2019/0219462 A1   7/2019  Nada et al.

FOREIGN PATENT DOCUMENTS

| JP | 2018-505413 | 2/2018 |
| JP | 2018-071998 | 5/2018 |
| JP | 63222475 | 5/2018 |
| WO | 2010/011938 | 1/2010 |

\* cited by examiner

DISPLACEMENT MEASUREMENT SYSTEM

BACKGROUND

1. Technical Field

The present disclosure relates to a displacement measurement system, particularly to a displacement measurement system for measuring a minute displacement and a pressure.

2. Description of the Related Art

In the related art, as a system for measuring a displacement or a pressure, a system in which a large number of thin film transistors are combined with a pressure-sensitive resin is known.

The pressure-sensitive resin is obtained by dispersing conductive particles in an insulating resin such as silicone rubber. In the pressure-sensitive resin, when a pressure is applied, a resistance value decreases due to the contact between the conductive particles in the insulating resin. As a result, the pressure applied to the pressure-sensitive resin can be detected. A large number of thin film transistors are arranged in a matrix and function as electrodes.

Further, there is also known a pressure sensor in which a pressure-sensitive layer and a plurality of electrodes are arranged so as to face each other with a predetermined gap (for example, refer to, Japanese Patent No. 6322247). For example, in the technique described in Japanese Patent No. 6322247, by arranging individual electrodes having different gaps between the pressure-sensitive layer and the electrodes in a matrix, a pressure measurement range is widened and a large area can be measured.

SUMMARY

According to one aspect of the present disclosure, there is provided a displacement measurement system including a sensor that is contactable with a measurement target object and includes a first spacer which has at least a one-dimensional spread, and two types of light emitting particles that are distributed over the spread of the first spacer and emit light at different wavelengths by an excitation energy;

an excitation energy source that causes the two types of light emitting particles included in the sensor to emit light; and a light receiver that receives light emitted from the sensor.

According to another aspect of the present disclosure, there is provided a displacement measurement system including a sensor that is contactable with a measurement target object and includes a first light emitting particle layer in which first light emitting particles that emit light at a first wavelength by an excitation energy are distributed over at least a one-dimensional spread, a second light emitting particle layer in which second light emitting particles that emit light at a second wavelength different from the first wavelength by the excitation energy are distributed over the spread, and a second spacer layer that separates the first light emitting particle layer from the second light emitting particle layer in a direction intersecting the spread;

an excitation energy source that causes the first light emitting particles and the second light emitting particles included in the sensor to emit light;

a light receiver that receives light emitted from the sensor; and an image analyzer that measures a displacement of the measurement target object that is in contact with the sensor based on a wavelength distribution of the received light.

DETAILED DESCRIPTIONS

In the configuration of the related art, since individual electrodes having different gaps are arranged, measurement that requires a certain pressing region or measurement of a minute region is difficult. Further, since the individual electrodes are arranged, there is a problem that a circuit becomes complicated in order to measure a sample having a large measurement area.

An object of the present disclosure is to solve the above-described problem in the related art, and to provide a system of measuring a displacement or a pressure capable of easily evaluating displacement measurement or pressure measurement in a minute region.

According to a first aspect, there is provided a displacement measurement system including a sensor that is contactable with a measurement target object and includes a first spacer that has at least a one-dimensional spread, and two or more types of light emitting particles that are distributed over the spread of the first spacer and emit light at different wavelengths by an excitation energy;

an excitation energy source that causes the two or more types of light emitting particles included in the sensor to emit light; and a light receiver that receives light emitted from the sensor; and With the above configuration, a displacement or a pressure in a minute region can be measured.

In a displacement measurement system according to a second aspect, in the first aspect, the two or more types of light emitting particles may have an overlap between a light emission spectrum of one type of light emitting particles and an excitation spectrum of the other type of light emitting particles.

In a displacement measurement system according to a third aspect, in the first or second aspect above, as the two or more types of light emitting particles, at least one of semiconductor nanoparticles and an organic dye may be used.

A displacement measurement system according to a fourth aspect, in any of the first to third aspects above, may further include an image analyzer that measures a displacement of the measurement target object that is in contact with the sensor based on a wavelength distribution of the received light.

According to a fifth aspect, there is provided a displacement measurement system including a sensor that is contactable with a measurement target object and includes a first light emitting particle layer in which first light emitting particles that emit light at a first wavelength by an excitation energy are distributed over at least a one-dimensional spread, a second light emitting particle layer in which second light emitting particles that emit light at a second wavelength different from the first wavelength by the excitation energy are distributed over the spread, and a second spacer layer that separates the first light emitting particle layer from the second light emitting particle layer in a direction intersecting the spread;

an excitation energy source that causes the first light emitting particles and the second light emitting particles included in the sensor to emit light;

a light receiver that receives light emitted from the sensor; and an image analyzer that measures a displacement of the measurement target object that is in contact with the sensor based on a wavelength distribution of the received light.

In a displacement measurement system according to a sixth aspect, in the fifth aspect, the first light emitting particles and the second light emitting particles may have an overlap between a light emission spectrum of one type of light emitting particles and an absorption spectrum of the other type of light emitting particles.

In a displacement measurement system according to a seventh aspect, in the fifth or sixth aspect above, at least one of semiconductor nanoparticles and an organic dye may be used as the first light emitting particles and the second light emitting particles.

In a displacement measurement system according to an eighth aspect, in any one of the first to seventh aspects, the excitation energy may be at least one of a light energy and an electrical energy.

As a pressure measurement system according to a ninth aspect, the displacement measurement system according to any one of the first to eighth aspects is used.

Hereinafter, the displacement measurement system according to the exemplary embodiment will be described with reference to the attached drawings. In the drawings, substantially the same members are denoted by the same reference numerals.

FIRST EXEMPLARY EMBODIMENT

Figure 1:
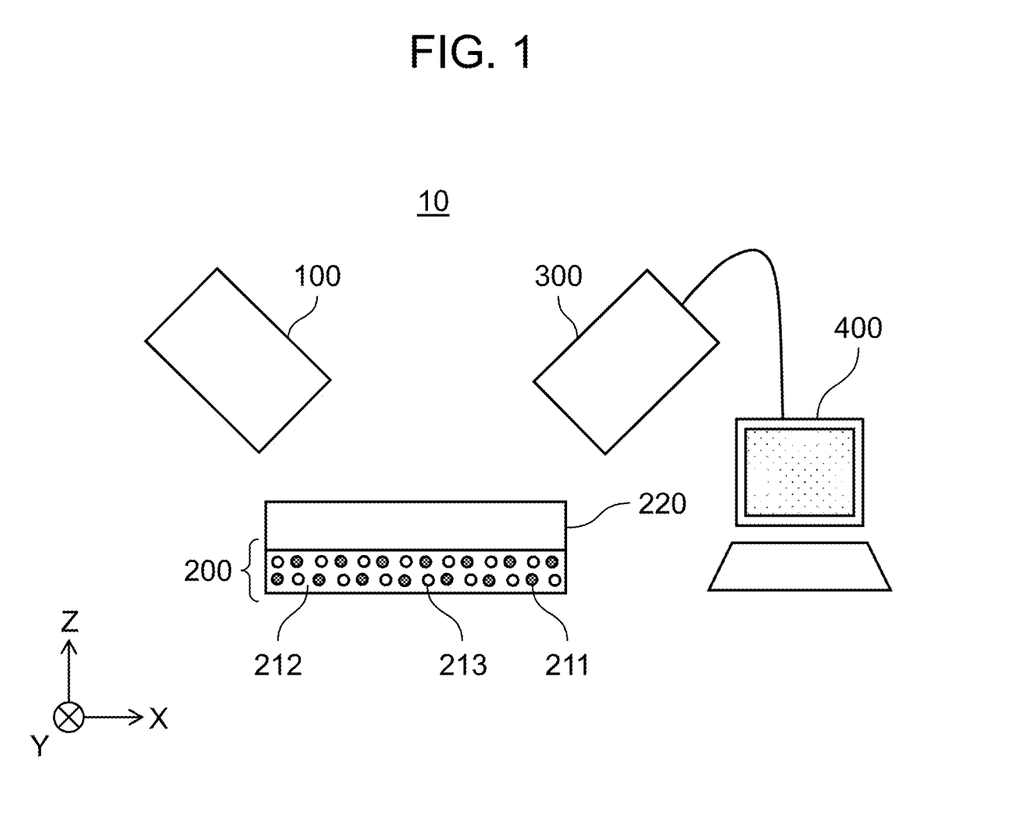
FIG. 1 is a schematic view showing a configuration of a displacement measurement system according to a first exemplary embodiment.

FIG. 1 is a schematic view showing a configuration of displacement measurement system 10 according to the first exemplary embodiment. In the drawings, for convenience, a plane showing a spread in a plane of sensor 200 is shown as an X-Y plane, a right side of a paper surface is shown as an X direction, and a vertical upper side is shown as a Z direction.

In FIG. 1, displacement measurement system 10 includes excitation energy source 100, sensor 200, light emitting/receiving element 300, and image analyzer 400. Sensor 200 is provided so as to be contactable with the measurement target object, and includes first spacer 212 that has at least a one-dimensional spread, and two or more types of light emitting particles 211 and 213 that are distributed over the spread of first spacer 212, and emit light at different wavelengths by an excitation energy. Excitation energy source 100 causes the two or more types of light emitting particles 211 and 213 included in sensor 200 to emit light. Light emitting/receiving element 300 receives the light emitted from sensor 200.

Displacement measurement system 10 has sensor 200 in which two or more types of light emitting particles 211 and 213 that emit light at different wavelengths are distributed over at least a one-dimensional spread. Therefore, a change in a distance between two or more types of light emitting particles 211 and 213 can be detected by a wavelength distribution of the light emission, and a displacement or a pressure in a minute region can be measured.

Sensor 200 may be supported by support 220.

Each member configuring displacement measurement system 10 will be described below.

Sensor

Sensor 200 is provided so as to be contactable with the measurement target object. Further, sensor 200 includes first spacer 212 having at least a one-dimensional spread, and two or more types of light emitting particles 211 and 213 which are distributed over the spread of first spacer 212 and emit light at different wavelengths by the excitation energy.

A thickness of sensor 200 is preferably 1 nm or more and 100,000 nm or less. The thickness of sensor 200 is more preferably 1 nm or more and 50,000 nm or less, and further preferably 3 nm or more and 10,000 nm or less. If the thickness is thinner than 1 nm, it is not possible to secure the change in the distance between light emitting particles 211 and 213 required for the sensor. If the thickness is thicker than 100,000 nm (100 μm), the change in the distance between the particles due to the displacement of the measurement target object that is in contact with the sensor is less likely to occur over the entire sensor, and the sensor does not function.

First Spacer

First spacer 212 has at least a one-dimensional spread. In FIG. 1, first spacer 212 has a two-dimensional spread. Further, light emitting particles 211 and 213 are dispersed in first spacer 212.

A material of the first spacer is not particularly limited as long as it is a material that is compressed by a pressure and does not inhibit light emission from light emitting particles 211 and 213. For example, silicone resin, polyvinyl chloride, polyurethane, polyvinyl alcohol, polypropylene, polyacrylamide, polycarbonate, polyethylene terephthalate, and the like can be used.

The thickness of first spacer 212 is substantially the same as the thickness of sensor 200, and is preferably 1 nm or more and 100,000 nm or less. The thickness of first spacer 212 is more preferably 1 nm or more and 50,000 nm or less, and further preferably 3 nm or more and 10,000 nm or less.

Light Emitting Particles

Light emitting particles 211 and 213 include two or more types of light emitting particles 211 and 213 that emit light at different wavelengths by the excitation energy.

Examples of light emitting particles 211 and 213 include semiconductor nanoparticles having cadmium sulfide, cadmium selenide, cadmium telluride, zinc sulfide, zinc selenium, zinc telluride, indium copper sulfide, indium silver sulfide, indium phosphate, and the like as a core, perovskite-type semiconductor nanoparticles such as lead halide cesium, semiconductor nanoparticles having silicon, carbon, and the like as a core, and an organic dye such as merocyanine, perylene, and the like can be used.

A particle size of two or more types of light emitting particles 211 and 213, for the semiconductor nanoparticles, may be any particle size with which a quantum size effect can be obtained, and is preferably 1 nm or more and 100 nm or less. More preferably, the particle size is 1 nm or more and 50 nm or less. Even when a raw material of the organic dye is in a form of powder, it is not affected by the particle size of the raw material powder.

Two or more types of light emitting particles 211 and 213 are substantially uniformly dispersed in first spacer 212 over at least the one-dimensional spread. In FIG. 1, two or more types of light emitting particles 211 and 213 are distributed substantially uniformly over two dimensions.

Support

A material of support 220 is not particularly limited as long as it is easy to handle and does not inhibit the light emission from light emitting particles 211 and 213. For example, polyethylene terephthalate, polyacrylamide, polycarbonate, and the like can be used. However, if there is no problem in handling sensor 200, support 220 is not necessarily a necessary configuration.

Excitation Energy Source

Excitation energy source 100 is not particularly limited as long as it is an excitation energy source capable of exciting light emitting particles 211 and 213 included in sensor 200. For example, a light energy source and an electrical energy source can be used. Further, in order to evaluate an observation range collectively, it is necessary to uniformly supply an excitation energy to light emitting particles 211 and 213 by excitation energy source 100.

Light Emitting/Receiving Element

Light emitting/receiving element 300 is not particularly limited as long as it is a light receiving element capable of receiving a change in a light emission behavior of light emitting particles 211 and 213. In particular, a CCD, a CMOS, an image sensor, or the like that can collectively evaluate an observation range can be used. By using these, it is possible to instantly analyze the light emission behavior within the observation range.

When a light energy source is used as the excitation energy source, it is preferable to use a wavelength cut filter to suppress an influence on the wavelength of excitation energy source 100 in order to increase detection sensitivity in light emitting/receiving element 300.

Image Analyzer

Further, image analyzer 400 that measures a displacement of the measurement target object that is in contact with sensor 200 based on the wavelength distribution of the received light may be further provided. It is preferable that image analyzer 400 can analyze the obtained image based on the chromaticity and the brightness, and calculate coordinates for obtaining a chromaticity difference and a brightness difference from the surroundings. Image analyzer 400 measures the displacement of the measurement target object that is in contact with sensor 200 based on the wavelength distribution of the received light. Specifically, the change in the distance between two types of light emitting particles 211 and 213 can be detected from the obtained wavelength distribution of the light, and a displacement or a pressure in a minute region can be measured. The details of a principle of the displacement measurement will be described later.

In displacement measurement system 10, excitation energy source 100 and light emitting/receiving element 300 are arranged obliquely with respect to a plane of sensor 200, but the above arrangement is an example, and the arrangement of excitation energy source 100 and light emitting/receiving element 300 is not particularly limited.

Next, the principle of the displacement measurement in the displacement measurement system according to the first exemplary embodiment will be described.

As the two or more types of light emitting particles that emit light at different wavelengths, a case where there is an overlap between a fluorescence spectrum (emission spectrum) of one light emitting particles (donor) and an excitation spectrum (absorption spectrum) of the other light emitting particles (acceptor) can be considered. In this case, it is known that when two light emitting particles that emit light at different wavelengths are close to each other, the excitation energy excites the acceptor before the donor excited by the excitation energy emits light. The behavior is called Felster resonance energy transfer (FRET), and the behavior of the wavelength distribution of the light emission spectra of the two types of light emitting particles depends on the distance between the two types of light emitting particles. In particular, if the FRET efficiency is a ratio of the number of energy transfers to the number of donor excitations, the FRET efficiency is inversely proportional to the sixth power of the distance between the two types of light emitting particles. Therefore, even a slight change in the distance may greatly affect the change in the light emission spectrum.

In displacement measurement system 10, by using the above-described principle, installing sensor 200 on the measurement target object, and applying a constant load, when there is a minute unevenness on the measurement target object, the load on sensor 200 differs from other portions only in the uneven portion. As a result, an amount of compression of the corresponding portion of sensor 200 for the uneven portion of the measurement target object changes from that of other portions, that is, the distance between the two types of light emitting particles changes only at the uneven portion. The light emission spectrum changes due to the FRET effect according to the change in the distance between the two types of light emitting particles. Therefore, by measuring the light emission spectra of the two types of light emission particles, it is possible to convert the change in the light emission spectrum generated at the uneven portion in the plane into the change in the distance between the two types of light emitting particles, that is, the displacement of the measurement target object.

Further, it is also possible to measure a reference type before measuring the measurement target object, and measure a relationship between the minute uneven portion and the displacement from the difference between the measurement of the measurement target object and the measurement of the reference type.

However, in order to calculate the amount of displacement, it is necessary to measure the change in the light emission spectrum with known materials with different displacements.

Although two types of light emitting particles 211 and 213 are shown to be uniformly arranged on first spacer 212 in FIG. 1, the distance between the two types of light emitting particles is not actually uniform, and it is considered that the two types of light emitting particles are ideally normally distributed with an average distance. Therefore, due to the distance between the light emitting particles being distributed with a width, the change in the light emission spectrum is also distributed with the width.

A case where semiconductor nanoparticles are used for both the donor and the acceptor, which are two or more types of light emitting particles, will be described. The semiconductor nanoparticles are nano-sized particles having semiconductor crystals, and have a characteristic that the light emission spectrum changes according to a particle diameter due to the quantum size effect. Further, even when the diameters of the particles are the same, if the materials of the particles are different, the particles have a characteristic that the light emission spectrum changes. Therefore, it is possible to realize various light emission spectra.

When the light emitting particles have the same particle diameter but different materials, one having the larger energy gap of the material itself indicates light emission on a short wavelength side. It is assumed that the semiconductor nanoparticles having a light emitting wavelength on a short wavelength side are semiconductor nanoparticles A and the semiconductor nanoparticles having a light emitting wavelength on a long wavelength side are semiconductor nanoparticles B. When the distance between the two semiconductor nanoparticles is sufficiently large, the semiconductor nanoparticles A and the semiconductor nanoparticles B indicate their respective light emission spectra. When the distance between the semiconductor nanoparticles becomes close due to the measurement target object, the semiconductor nanoparticles A and B are excited in accordance with the distance, and energy transfer from the semiconductor nanoparticles A to the semiconductor nanoparticles B occurs before the semiconductor nanoparticles A emit light, and the energy that should be emitted from the semiconductor nanoparticles A is used for the emission of the semiconductor nanoparticles B. As a result, a light emission spectrum intensity of the semiconductor nanoparticles A decreases, and the light emission spectrum of the semiconductor nanoparticles B increases. That is, in the overall light emission spectrum of the two semiconductor nanoparticles, the light emission spectrum intensity of the semiconductor nanoparticles A on the short wavelength side is lower than that in a case of a single substance, and the light emission spectrum intensity of the semiconductor nanoparticles B on the long wavelength side has a wavelength distribution increased as compared with a case of a single substance. The behavior of the wavelength distribution in the entire light emission spectrum changes according to the distance between the two semiconductor nanoparticles A and B.

Therefore, the change in the distance between the two types of semiconductor nanoparticles A and B, that is, the displacement of the measurement target object can be calculated based on the wavelength distribution of the light emission spectrum in the plane of the sensor.

The pressure received from the measurement target object may be calculated instead of the displacement of the measurement target object based on the wavelength distribution of the light emission spectrum in the plane of the sensor.

Modification 1

Figure 2:
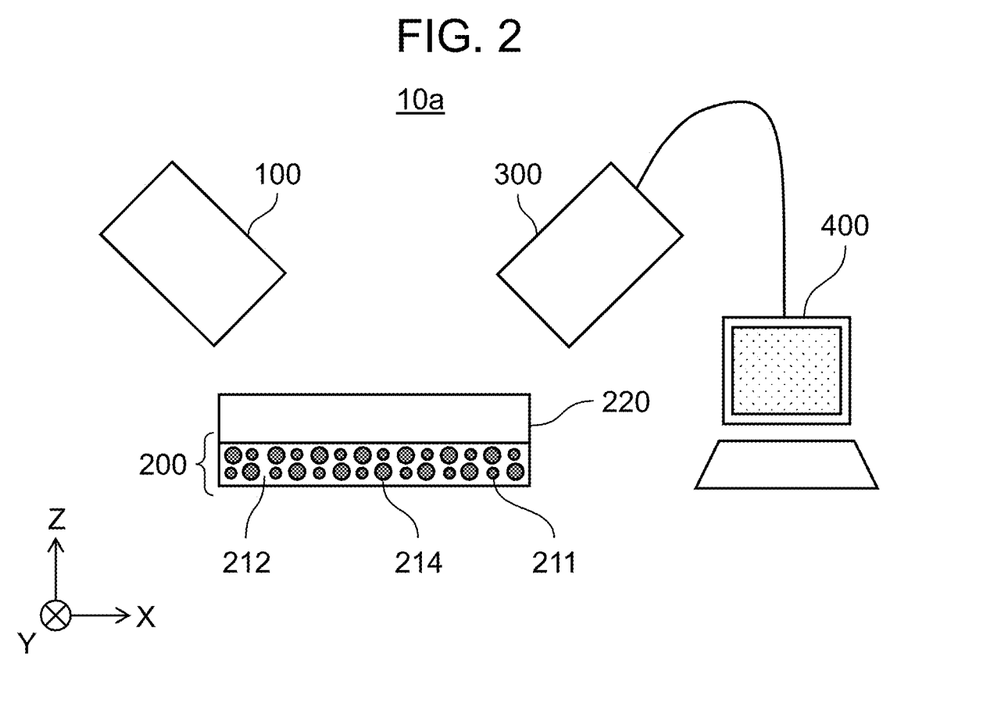
FIG. 2 is a schematic view showing a configuration of Modification 1 of a displacement measurement system according to the first exemplary embodiment.

FIG. 2 is a schematic view showing a configuration of Modification 1 of a displacement measurement system according to the first exemplary embodiment.

Displacement measurement system 10a according to Modification 1 is different from the displacement measurement system according to the first exemplary embodiment in that two types of light emitting particles 211 and 214 are made of the same material but have different particle diameters. When the particles are made of the same material but have different particle diameters, one having a smaller particle diameter indicates light emission on a short wavelength side due to the quantum size effect. In FIG. 2, light emitting particles 211 having a small particle diameter have a light emitting wavelength on a short wavelength side, and light emitting particles 214 having a large particle diameter have a light emitting wavelength on a long wavelength side. When the semiconductor nanoparticles are used as the light emitting particles, light emitting particles 211 having a small particle diameter correspond to the semiconductor nanoparticles A on the short wavelength side, and light emitting particles 214 having a large particle diameter correspond to the semiconductor nanoparticles B on the long wavelength side. As described above, the energy transfer occurs in accordance with an interparticle distance between the semiconductor nanoparticles A on the short wavelength side and the semiconductor nanoparticles B on the long wavelength side, and the wavelength distribution of the light emission spectrum changes.

Therefore, the change in the distance between the two types of semiconductor nanoparticles A and B, that is, the displacement of the measurement target object can be calculated based on the wavelength distribution of the light emission spectrum in the plane of the sensor.

When the organic dye is used as the light emitting particles, the displacement of the measurement target object can be detected with the same principle.

As described above, when a FRET phenomenon occurs, the light emission spectrum of the light emitting particles or dye molecules that emit light on the short wavelength side decreases, and the light emission spectrum of the light emitting particles or dye molecules that emit light on the long wavelength side is increased. It is preferable that a light emitting peak wavelength on the short wavelength side and a light emitting peak wavelength on the long wavelength side are separated by 10 nm or more. It is more preferable that the distance is 30 nm or more. When the light emitting peak wavelengths are closer than 10 nm, a light emission peak intensity of the spectrum having a low light emitting intensity overlaps with the other spectrum, and it becomes difficult to detect the change in the wavelength distribution in the light emission spectrum.

Further, in order to detect a minute change in the wavelength distribution in the light emission spectrum, it is necessary to keep the distance between the two types of light emitting particles constant, and high-concentration uniform dispersion is required when the two types of light emitting particles are dispersed in the resin material configuring first spacer 212.

Modification 2

Figure 3:
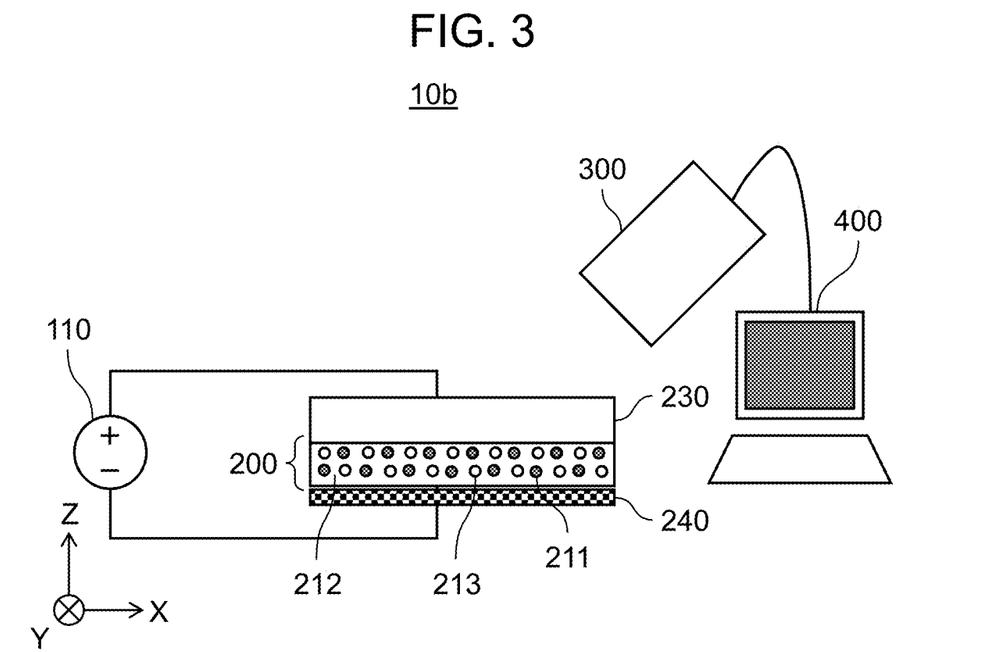
FIG. 3 is a schematic view showing a configuration of Modification 2 of a displacement measurement system according to the first exemplary embodiment.

FIG. 3 is a schematic view showing a configuration of Modification 2 of a displacement measurement system according to the first exemplary embodiment.

The displacement measurement system according to Modification 2 is different from the displacement measurement system according to the first exemplary embodiment in that electrical energy source 110 is used as the excitation energy source.

As shown in FIG. 3, when electrical energy source 110 is used, for example, the electrical energy can be applied by sandwiching sensor 200 between anode board 230 and cathode board 240, and applying a voltage to sensor 200. In this case, sensor 200 can be laminated on anode board 230, and cathode board 240 can be laminated on sensor 200.

Anode board 230 is preferably a board that does not inhibit light emission from light emitting particles 211 and 213, and for example, ITO or the like can be used. Further, aluminum or the like can be used for cathode board 240.

As the configuration of sensor 200, the configurations of the first exemplary embodiment and Modification 1 can be used, and thus the description thereof will be omitted.

SECOND EXEMPLARY EMBODIMENT

Figure 4:
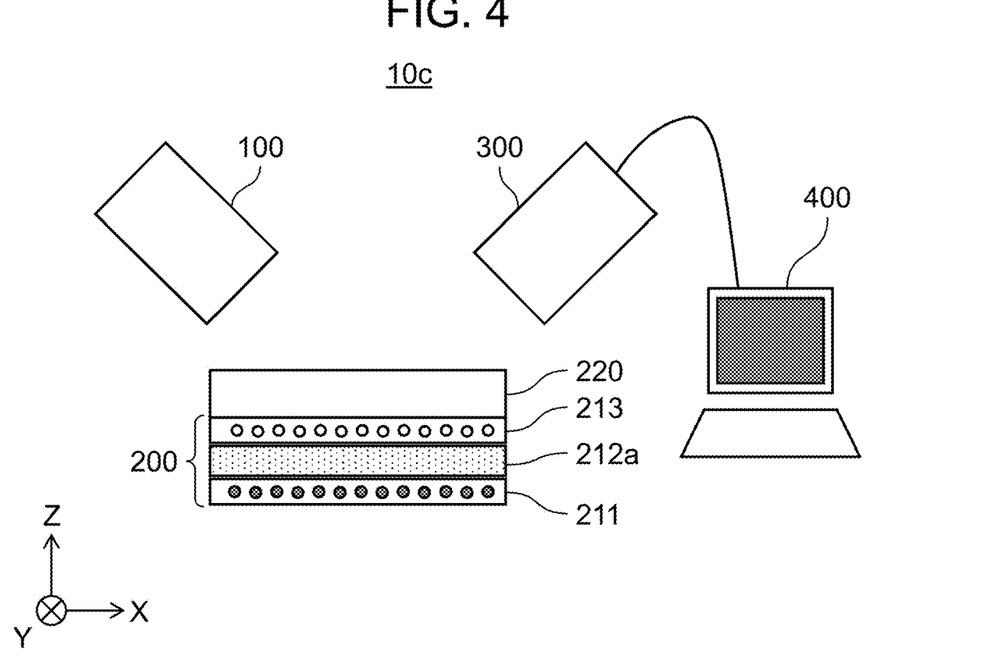
FIG. 4 is a schematic view showing a configuration of a displacement measurement system according to a second exemplary embodiment.

FIG. 4 is a schematic view showing a configuration of a displacement measurement system according to the second exemplary embodiment. In FIG. 4, the same reference numerals are used for the same components as those in FIG. 1, and the description thereof will be omitted.

Displacement measurement system 10c according to the second exemplary embodiment is different from the displacement measurement system according to the first exemplary embodiment in that two types of first light emitting particles 211 and second light emitting particles 213 configure first light emitting particle layer 11 and second light emitting particle layer 12, respectively.

As shown in FIG. 2, displacement measurement system 10c includes excitation energy source 100, sensor 200, light emitting/receiving element 300, and image analyzer 400. Sensor 200 is provided so as to be contactable with the measurement target object. Further, sensor 200 includes first light emitting particle layer 11, second spacer layer 212a, and second light emitting particle layer 12. In first light emitting particle layer 11, first light emitting particles 211 that emit light at a first wavelength by the excitation energy are distributed over at least a one-dimensional spread. In second light emitting particle layer 12, second light emitting particles 213 that emit light at a second wavelength different from the first wavelength by the excitation energy are distributed over the spread. Second spacer layer 212a separates first light emitting particle layer 11 and second light emitting particle layer 12 in a direction intersecting the spread. Excitation energy source 100 causes first light emitting particles 211 and second light emitting particles 213 included in sensor 200 to emit light. Light emitting/receiving element 300 receives light emitted from the sensor. Further, image analyzer 400 measures the displacement of the measurement target object that is in contact with sensor 200 based on the wavelength distribution of the received light.

In the second exemplary embodiment, excitation energy source 100, light emitting/receiving element 300, and image analyzer 400 are the same components as those in the first exemplary embodiment, and thus the description thereof will be omitted.

The sensor of the second exemplary embodiment has first light emitting particle layer 11 including first light emitting particles 211 that emit light at a first wavelength, second light emitting particle layer 12 including second light emitting particles 211 that emit light at a second wavelength, second spacer layer 212a, and support 220. As a layer structure, first light emitting particle layer 11 and second light emitting particle layer 12 are arranged so as to face each other via second spacer layer 212a. That is, second spacer layer 212a is disposed between the particles on the donor side and the particles on the acceptor side. In other words, in a state where the particles are not displaced, the particles on the donor side and the particles on the acceptor side are separated by a thickness of second spacer layer 212a.

In this manner, the distance between the particles on the donor side and the particles on the acceptor side can be defined as the thickness of second spacer layer 212a, instead of being defined as the distribution centered on the average distance as in the first exemplary embodiment.

Second Spacer Layer

The thickness of second spacer layer 212a is preferably 1 nm or more and 1,000 nm or less. More preferably, the thickness is 1 nm or more and 500 nm or less. Even more preferably, the thickness is 3 nm or more and 300 nm or less. If the thickness is thinner than 1 nm, the change in the distance between the two types of light emitting particles cannot be secured, and it cannot be used as a sensor. In the second exemplary embodiment, the thickness of second spacer layer 212a is 1,000 nm or less, which is sufficient for a sensor.

A method for manufacturing second spacer layer 212a is not particularly limited, but a method capable of controlling a thin film such as a layer by layer (LBL) method and a spin coater method can be used.

The LBL method is a method in which a cationic polymer and an anionic polymer are alternately adsorbed by an electrostatic force to control a thin film.

A material of second spacer layer 212a is not particularly limited, but is partially limited depending on the method adopted. For example, in the LBL method, cationic polymers such as polyallylamine and polydiallyl dimethyl ammonium chloride, and ionic polymers such as polyacrylic acid, polystyrene sulfonic acid, polyisoprene sulfonic acid, and anionic polymers can be used. The spin coater method is not particularly limited as long as a material that dissolves in a solvent is used, and the above-described ionic polymer, silicone resin, polyvinyl chloride, polyurethane, polyvinyl alcohol, polypropylene, polyacrylamide, polycarbonate, polyethylene terephthalate, and the like can be used.

By controlling the thickness of second spacer layer 212a, the distance between the two types of light emitting particles that emit light in the plane can be optionally controlled.

Since the principle of the displacement measurement by sensor 200 is the same as that of the first exemplary embodiment, the description thereof will be omitted.

Modification 3

Figure 5:
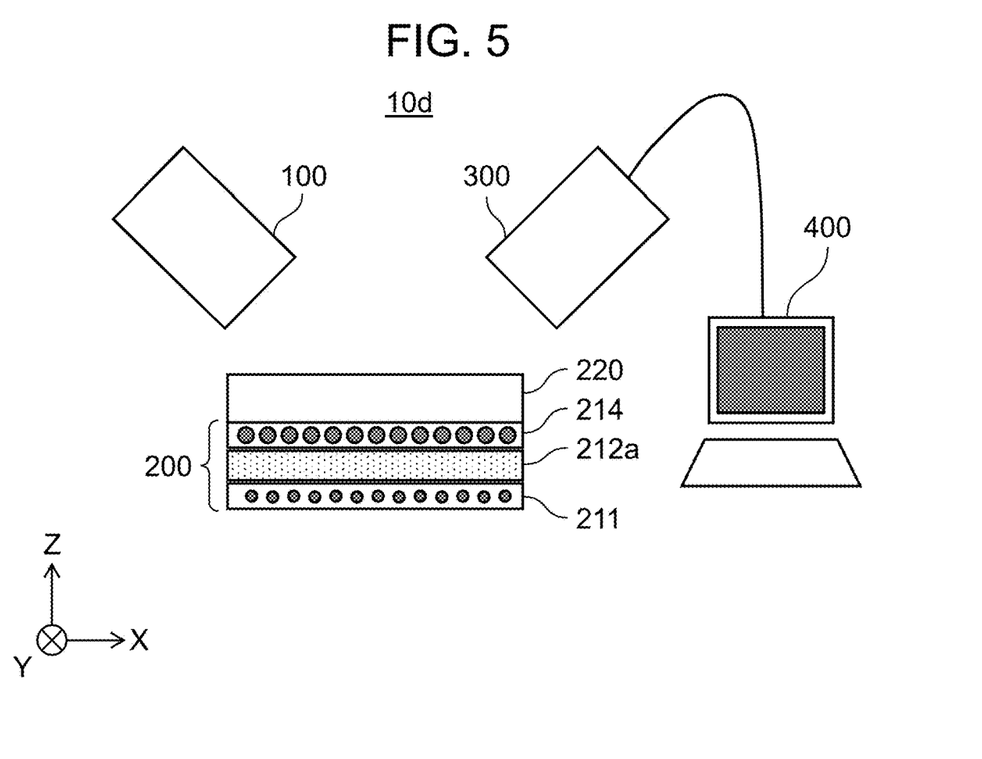
FIG. 5 is a schematic view showing a configuration of Modification 3 of a displacement measurement system according to the second exemplary embodiment.

FIG. 5 is a schematic view showing a configuration of Modification 3 of the displacement measurement system according to the second exemplary embodiment.

Displacement measurement system 10d is different from the displacement measurement system according to the second exemplary embodiment in that second light emitting particles 214 are made of the same material as that of first light emitting particles 211 and have different particle diameters. The above points are the same as in Modification 1.

Since the principle of the displacement measurement by second spacer layer 212a and sensor 200 is the same as that of the second exemplary embodiment, the description thereof will be omitted.

The present disclosure includes appropriately combining any of the various exemplary embodiments and/or examples described above, and the effects of the respective exemplary embodiments and/or examples can be achieved.

According to the displacement measurement system according to the present disclosure, it is possible to easily measure a displacement or a pressure in a minute region. The displacement measurement system according to the present disclosure can also be applied to the measurement of minute scratches and irregularities of optical lenses, precision machined components, and the like.

What is claimed is:

1. A displacement measurement system comprising:
   a sensor that is contactable with a measurement target object and includes a first spacer that has at least a one-dimensional spread, and two or more types of light emitting particles that are distributed over the spread of the first spacer and emit light at different wavelengths by an excitation energy;
   an excitation energy source that causes the two or more types of light emitting particles included in the sensor to emit light; and a light receiver that receives light emitted from the sensor,
wherein the two or more types of light emitting particles are made of a same material but have different respective particle diameters.

2. The displacement measurement system of claim 1, wherein the two or more types of light emitting particles have an overlap between a light emission spectrum of one type of the light emitting particles and an excitation spectrum of another type of the light emitting particles.

3. The displacement measurement system according to claim 1, wherein, as the two or more types of light emitting particles, at least one of semiconductor nanoparticles and an organic dye is used.

4. The displacement measurement system of claim 1, further comprising:
an image analyzer that measures a displacement of the measurement target object that is in contact with the sensor based on a wavelength distribution of the received light.

5. The displacement measurement system of claim 1, wherein the excitation energy is at least one of a light energy and an electrical energy.

6. A pressure measurement system using the displacement measurement system of claim 1.

7. A displacement measurement system comprising:
a sensor that is contactable with a measurement target object and includes a first light emitting particle layer in which first light emitting particles that emit light at a first wavelength by an excitation energy are distributed over at least a one-dimensional spread, a second light emitting particle layer in which second light emitting particles that emit light at a second wavelength different from the first wavelength by the excitation energy are distributed over the spread, and a second spacer layer that separates the first light emitting particle layer from the second light emitting particle layer in a direction intersecting the spread;
an excitation energy source that causes the first light emitting particles and the second light emitting particles included in the sensor to emit light;
a light receiver that receives light emitted from the sensor; and
an image analyzer that measures a displacement of the measurement target object that is in contact with the sensor based on a wavelength distribution of the received light.

8. The displacement measurement system of claim 7, wherein the first light emitting particles and the second light emitting particles have an overlap between a light emission spectrum of one type of the light emitting particles and an absorption spectrum of the other type of the light emitting particles.

9. The displacement measurement system of claim 7, wherein, as the first light emitting particles and the second light emitting particles, at least one of semiconductor nanoparticles and an organic dye is used.

10. The displacement measurement system of claim 7, wherein the excitation energy is at least one of a light energy and an electrical energy.

11. A pressure measurement system using the displacement measurement system of claim 7.

* * * * *